US012686067B2

(12) United States Patent
Ramun

(10) Patent No.: US 12,686,067 B2
(45) Date of Patent: Jul. 21, 2026

(54) REPLACEABLE SHEAR TIP WITH INTERLOCKING INSERTS

(71) Applicant: Michael Richard Ramun, Mineral Ridge, OH (US)

(72) Inventor: Michael Richard Ramun, Mineral Ridge, OH (US)

( * ) Notice: Subject to any disclaimer, the term of this patent is extended or adjusted under 35 U.S.C. 154(b) by 180 days.

(21) Appl. No.: 18/524,881

(22) Filed: Nov. 30, 2023

(65) Prior Publication Data

US 2025/0178106 A1 Jun. 5, 2025

(51) Int. Cl.
*B23D 35/00* (2006.01)
*B23D 17/00* (2006.01)

(52) U.S. Cl.
CPC ......... *B23D 35/002* (2013.01); *B23D 35/001* (2013.01); *B23D 17/00* (2013.01)

(58) Field of Classification Search
CPC ....... E04G 23/082; B23P 17/02; B23D 17/00; B23D 17/04; B23D 17/06; B23D 17/08; B23D 215/02; B23D 15/04; B23D 15/06; B23D 35/00; B23D 35/001; B23D 35/002; E02F 9/2808; E02F 9/2858
See application file for complete search history.

(56) References Cited

U.S. PATENT DOCUMENTS

| | | | |
|---|---|---|---|
| 6,926,217 B1 | 8/2005 | LaBounty et al. | |
| 7,354,010 B2 | 4/2008 | Ramun et al. | |
| 7,895,755 B2 | 3/2011 | Jacobson et al. | |
| 8,231,071 B2 | 7/2012 | Ramun et al. | |
| 8,628,035 B2 | 1/2014 | Ramun | |
| 9,044,815 B2 | 6/2015 | Ramun | |
| 9,132,490 B2 | 9/2015 | Ramun | |
| 10,316,530 B2 | 6/2019 | Van Gemert | |
| 10,322,413 B2 | 6/2019 | Raihala | |
| 11,529,634 B2 | 12/2022 | Brouwers | |
| 2005/0235498 A1* | 10/2005 | Cossette | E02F 3/965 30/134 |
| 2006/0131454 A1 | 6/2006 | Ramun et al. | |
| 2013/0068079 A1* | 3/2013 | Kimura | E04G 23/082 83/694 |
| 2015/0197917 A1* | 7/2015 | Clemons | E02F 3/965 241/101.73 |
| 2015/0225925 A1* | 8/2015 | Jacobson | E04G 23/082 30/134 |
| 2020/0086326 A1* | 3/2020 | Johnson | E02F 3/965 |
| 2021/0154753 A1* | 5/2021 | Johnson | E02F 9/2883 |
| 2022/0297207 A1* | 9/2022 | Jacobson | B23D 35/001 |

FOREIGN PATENT DOCUMENTS

| | | | |
|---|---|---|---|
| WO | WO-2019209537 A1 * | 10/2019 | E02F 9/2883 |

\* cited by examiner

*Primary Examiner* — Jennifer S Matthews
(74) *Attorney, Agent, or Firm* — The Webb Law Firm

(57) ABSTRACT

A tip assembly for a jaw of a jaw set for demolition and construction equipment has a base with a top side, an underside, and a protrusion extending along a longitudinal axis and extending from the underside. The tip also has a first insert mounted to the base and a second insert mounted to the base. Each insert has a first wall and an opposing second wall with a front side extending therebetween. Each insert also has a locking recess that conforms to the protrusion to limit movement of the insert in directions perpendicular to the longitudinal axis.

15 Claims, 16 Drawing Sheets

28B

26

24

28A

30

REPLACEABLE SHEAR TIP WITH INTERLOCKING INSERTS

BACKGROUND OF THE INVENTION

Field of the Invention

The present invention relates to a tip used for scrap recycling or demolition equipment which is adapted to be attached to a replaceable base and used in conjunction with, for example, a heavy-duty metal cutting shear, a grapple, or other construction and demolition equipment. More particularly, the present invention relates to a replaceable tip secured to a replaceable base.

Description of Related Art

For purposes of discussion herein, scrap recycling and demolition equipment may also be referred to as scrap handling equipment. The description of scrap recycling and demolition equipment herein is not intended to be restrictive of the equipment being referenced. Demolition equipment, such as heavy-duty metal cutting shears and grapples, are mounted on excavators and other construction equipment powered by hydraulic cylinders for a variety of jobs in the demolition field. This equipment provides for the efficient cutting and handling of scrap. For example, in the dismantling of an industrial building, metal scrap in the form of various diameter pipes, structural I-beams, channels, angles, sheet metal plates, and the like must be efficiently severed and handled by heavy duty metal shears. Such shears can also be utilized for reducing automobiles, truck frames, railroad cars, and the like. The shears must be able to move and cut the metal scrap pieces regardless of the size or shape of the individual scrap pieces and without any significant damage to the shears. In the demolition of an industrial building, metal shears are also used to reduce the structure to manageable components which can be easily handled and removed from the site. In addition, a grapple is often utilized where handling of debris or work pieces is a primary function of the equipment.

For illustrative purposes, the following discussion will be directed to metal shears. One type of metal shear is a shear having a fixed blade and a movable blade pivoted thereto. The movable blade is pivoted by a hydraulic cylinder to provide a shearing action between the blades for severing the work pieces.

U.S. Pat. No. 7,895,755 is directed to a replaceable demolition shear tip wherein the tip is bolted directly to the blade of the machine.

FIG. 1 illustrates a prior art, multiple tool attachment adapted to be attached to demolition or construction equipment, such as an excavator (not shown). The multiple tool attachment is adapted to connect one of a series of tools or tool units to the demolition equipment. The tool attachment in FIG. 1 is a metal shear 10. The shear 10 includes a first blade 12 connected to a first jaw 13 and a second blade 14 connected to a second jaw 15, wherein the jaws 13, 15 are pivotally connected at a hub or main pin 16 to a universal body 18. The body 18 is referred to as universal because it remains common to a series of tools or tool units in the attachment system. The universal body 18 may be comprised of sides 19, a bearing housing 20, and a yoke 21.

The first jaw 13 and the second jaw 15 pivot about the main pin 16 to form a movable jaw assembly 22. At the end of the first blade 12 is a tip assembly 24. The encircled portion of FIG. 1 is enlarged in FIG. 2 and illustrated in an exploded perspective in FIG. 3. The tip assembly 24 is comprised of a replaceable base 26 with inserts 28A, 28B secured to each side of the base 26 with a single bolt 30.

Additionally the inserts 28A, 28B, although attached to the base 26 during a machining operation, leave the base 26 exposed to the workpiece such that the base 26 becomes a wear part just as the inserts 28A, 28B become wear parts and must be replaced at regular intervals.

A tip design is desired, wherein the tip and base are replaceable and wherein the tip protects the base 26 and to more uniformly distribute the load generated by cutting forces on the inserts 28A, 28B to the base 26.

SUMMARY OF THE INVENTION

A tip assembly for a jaw of a jaw set for demolition and construction equipment has a base with a top side and an underside, and a protrusion extending along a longitudinal axis and extending from the underside. A first insert is mounted to the base and a second insert is mounted to the base. Each insert has a first wall and an opposing second wall with a front side extending therebetween, and a locking recess that conforms to the protrusion to limit movement of the insert in directions perpendicular to the longitudinal axis.

In another embodiment, an insert to be used with a base attached to a jaw of a jaw set for demolition and construction equipment has a first wall and an opposing second wall with a front side extending therebetween, wherein an edge of the first wall is a piercing edge. The insert also has a locking recess extending within the first wall. The insert further has a first bore having a first bore diameter and inner and outer bore walls, wherein the first bore extends through the first wall and second wall, and a second bore having a second bore diameter and inner and outer bore walls. The inner bore wall of the first bore is spaced from the inner bore wall of the second bore by a length at least equal to the diameter of the first bore wall.

DESCRIPTION OF THE INVENTION

The discussion of prior art is directed to a shear with two movable jaws about a common pivot. The subject invention is not limited to this arrangement but may include a tool whereby one jaw rotates and another jaw is fixed relative to a common pivot. Further arrangements may include a tool that has a two jaws each with their own pivot, wherein the pivots are spaced from one another. In yet another arrangement, a tool may have a jaw with a pivot and another jaw fixed to the tool but spaced from the pivot.

Figure 1:
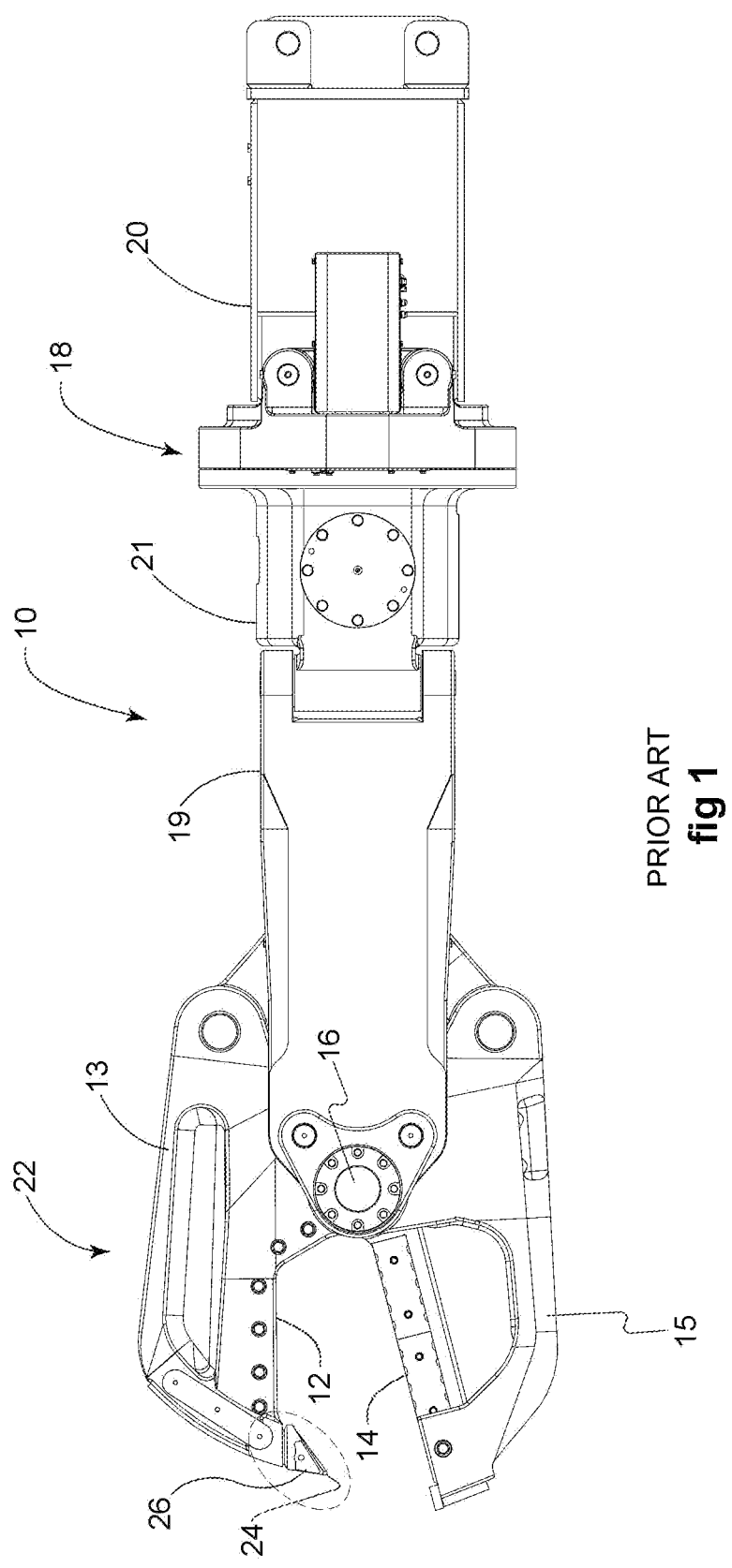
FIG. 1 is prior art and is a side view illustrating a metal shear mounted upon a universal body for a construction tool system.
Figure 2:
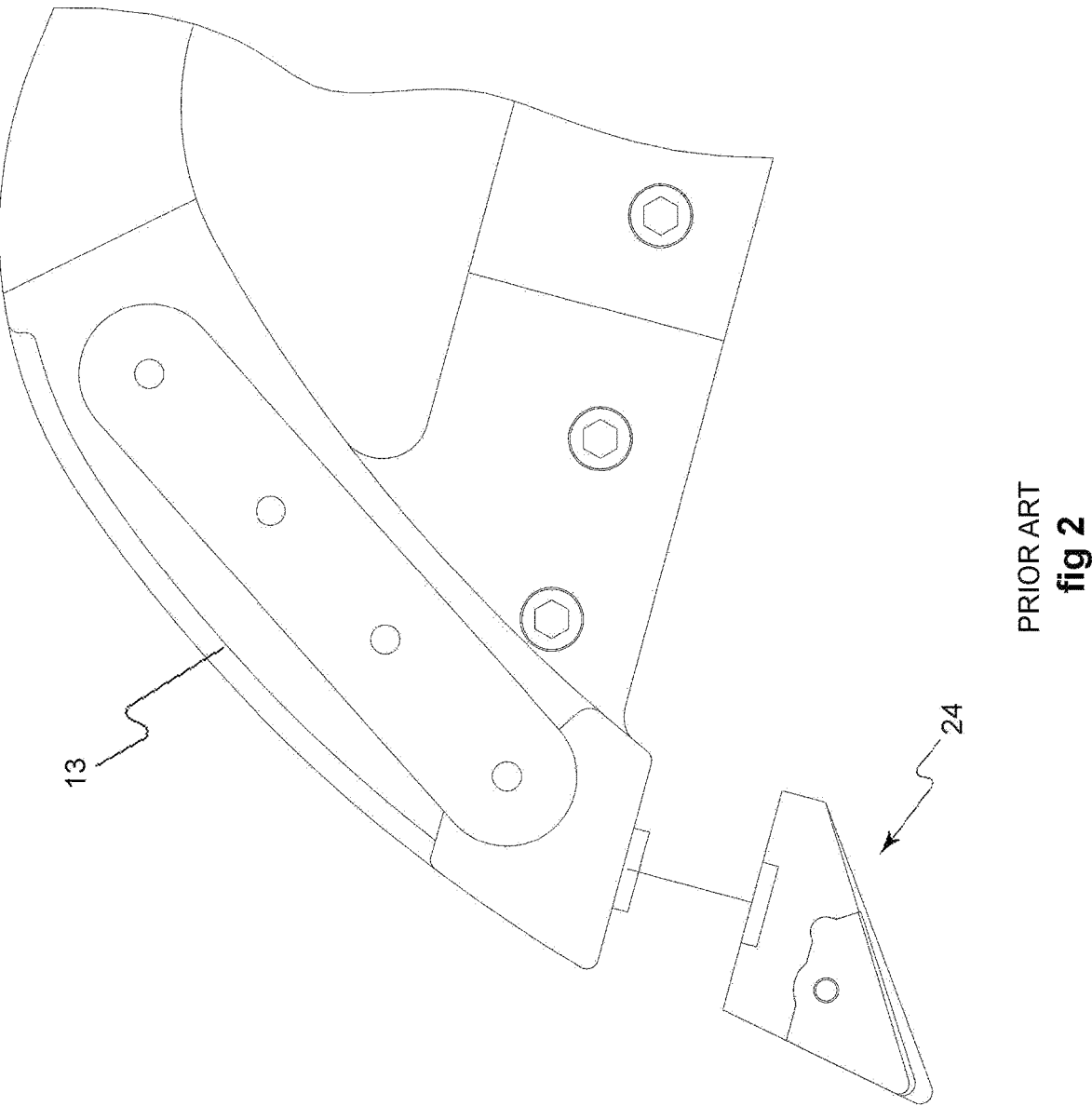
FIG. 2 is prior art and is an enlarged view of the encircled portion in FIG. 1.
Figure 3:
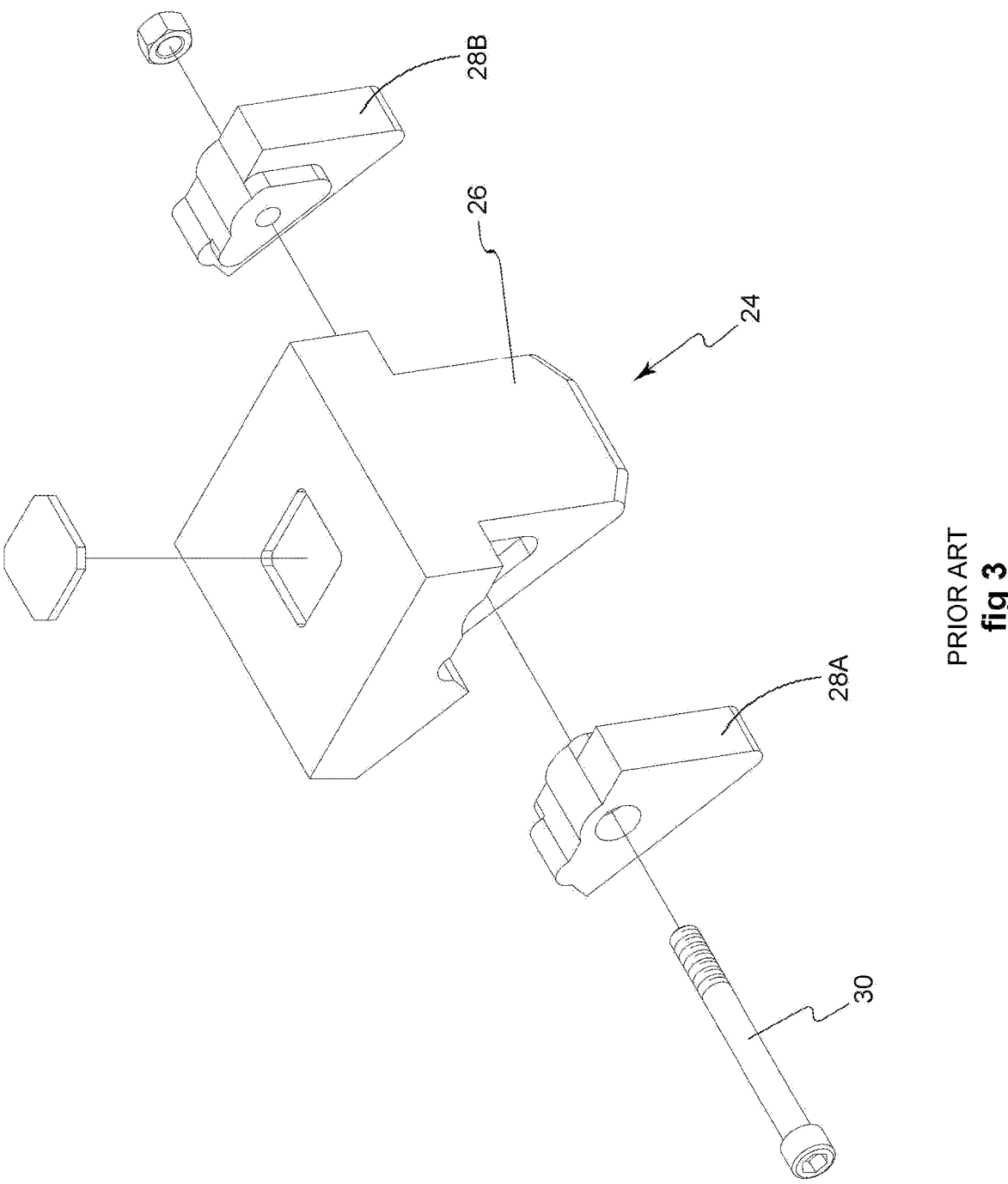
FIG. 3 is prior art and is an exploded view of the tip assembly illustrated in FIG. 2.
Figure 4:
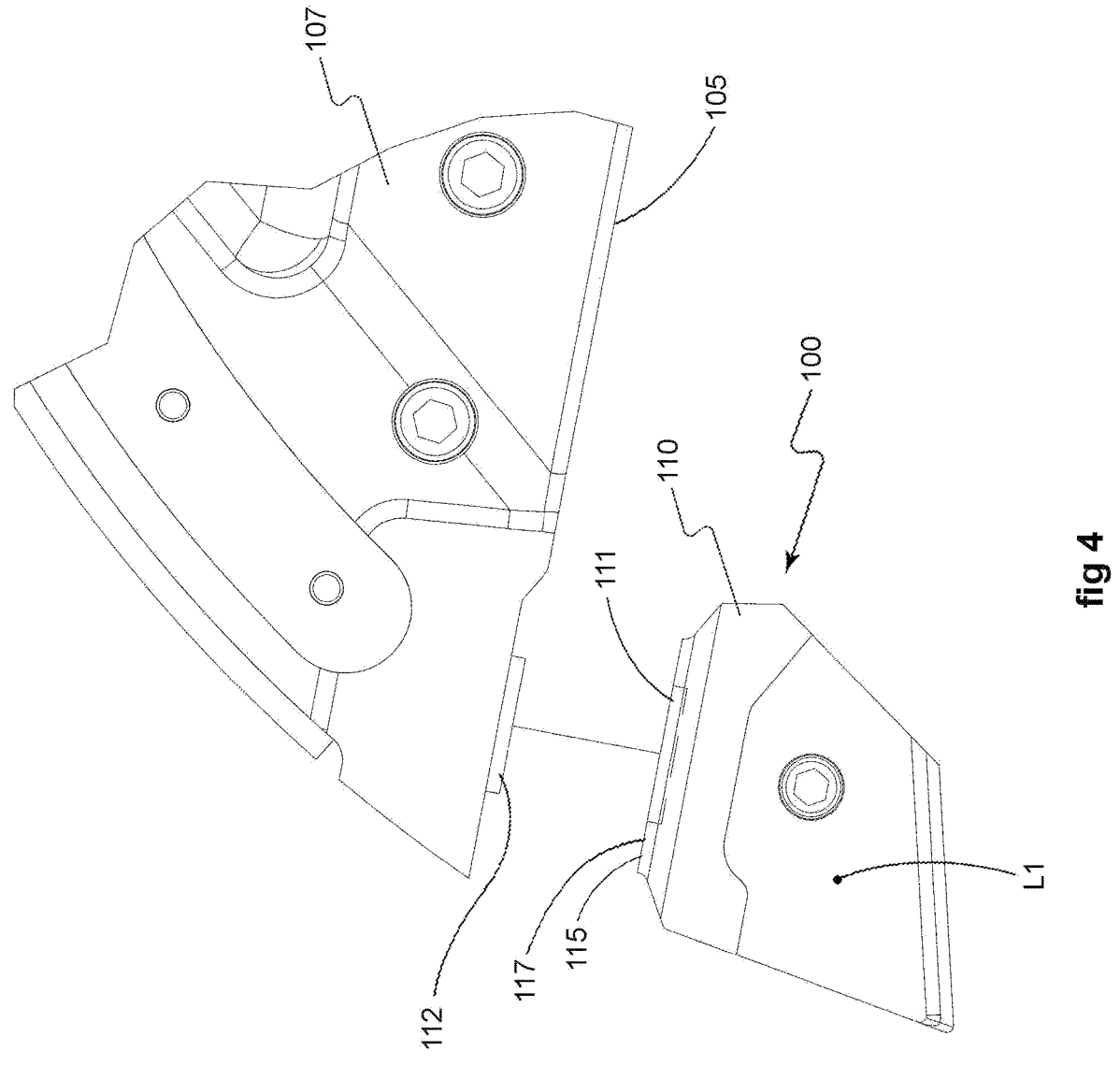
FIG. 4 is an exploded side view of a tip assembly in accordance with the subject invention associated with the blade of a machine.

FIG. 4 illustrates a tip assembly 100 and the manner by which the tip assembly 100 is mounted to the first blade 105 of a first jaw 107 of a machine. While FIG. 4 illustrates an exploded view, it should be noted that the tip assembly 100 is welded onto the first blade 105. As a result, it is possible to replace the entire tip assembly 100 by releasing the weld and welding a replacement tip assembly to the first blade 105.

The tip assembly 100 has a base 110 with an indentation 111 that meets with an extension 112 on the first blade 105 to secure the tip assembly 100 in a predetermined orientation.

Directing attention to FIGS. 4 through 8, the base 110 of the tip assembly 100 has a top side 115 and an underside 120. The base 110 also has a protrusion 125 extending along a longitudinal axis L1 (see FIGS. 4 and 8) and extending from the underside 120 of the base 110.

As illustrated in FIG. 4, the top side 115 of the base 110 provides a mounting surface 117 which is adapted to be secured to the first jaw 107.

A first insert 130A is mounted to the base 110 and a second insert 130B is also mounted to the base 110.

Directing attention to first insert 130A, first insert 130A has a first wall 135A and an opposing second wall 140A with a front side 145A extending there between.

The first insert 130A also has a locking recess 150A that conforms to the protrusion 125 to limit movement of the first insert 130A in directions perpendicular to the longitudinal axis L1. The second insert 130B includes the same elements and for purposes of clarity the figures have been labeled as such but with the suffix "A" replaced with "B" to illustrate elements of the second insert 130B. Unless otherwise noted, for purposes of discussion first insert 130A will be examined with the understanding that second insert 130B is a mirror image of insert 130A with similar elements but oriented differently to engage with the base 110.

FIGS. 5-8 show different views of the same assembly.

Figure 5:
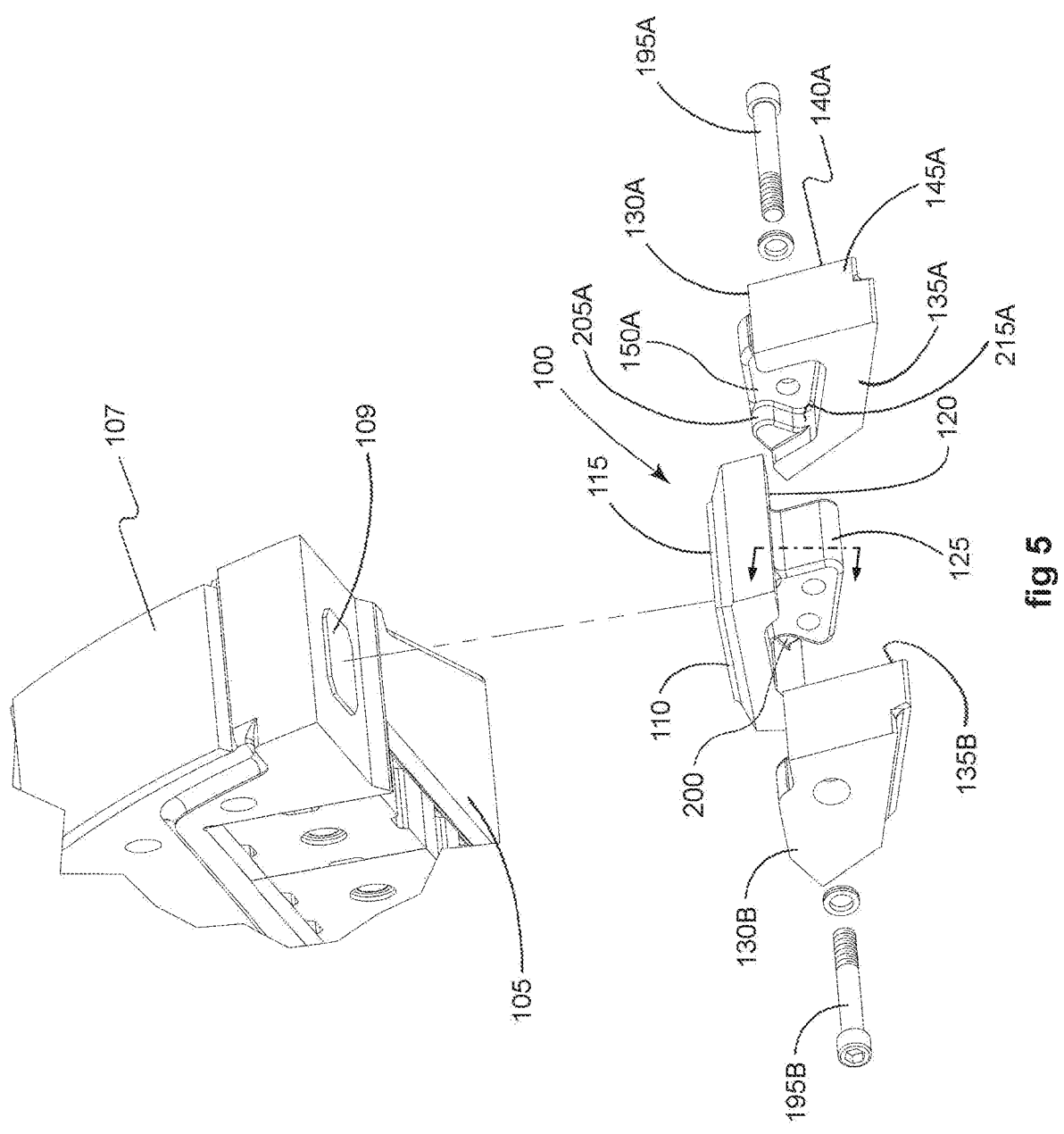
FIG. 5 is an exploded perspective view of the tip assembly in FIG. 4.
Figure 9:
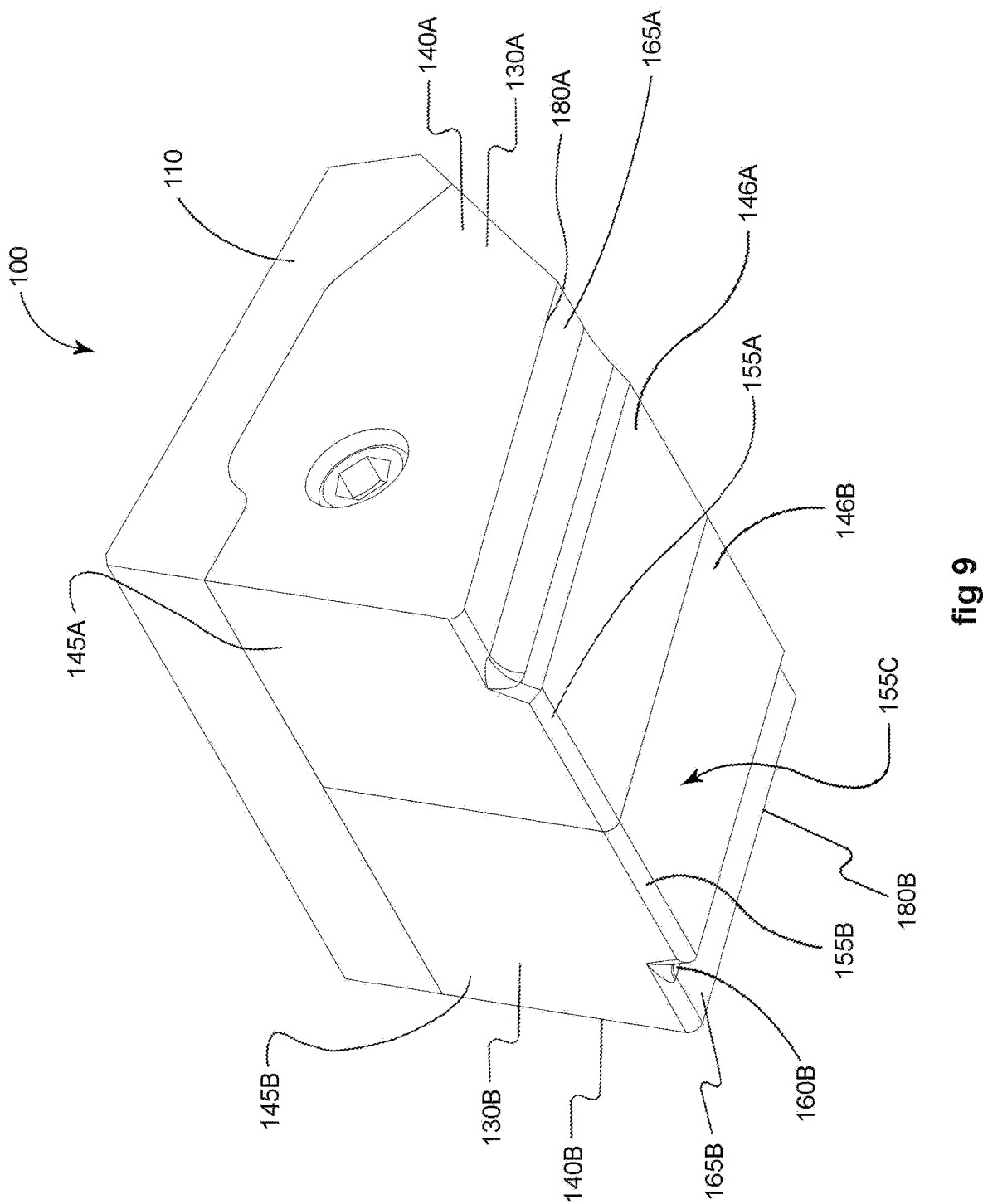
FIG. 9 is a perspective view of the tip assembly in FIG. 4.

Briefly directing attention to FIGS. 5 and 9, the first wall 135A of the first insert 130A and the first wall 135B of the second insert 130B contact each other such that the inserts 130A and 130B enclose the protrusion 125.

Directing attention to FIG. 9, the front side 145A and the bottom side 146A of the first insert 130A intersect to form a piercing edge 155A. The front side 145B and the bottom side 146B of the second insert 130B intersect to form a piercing edge 155B.

As a result, an expanded piercing edge 155C extends continuously across the tip assembly 100 and is formed by piercing edge 155A of the first insert 130A and the piercing edge 155B of the second insert 130B when the inserts 130A, 130B abut.

Figure 16:
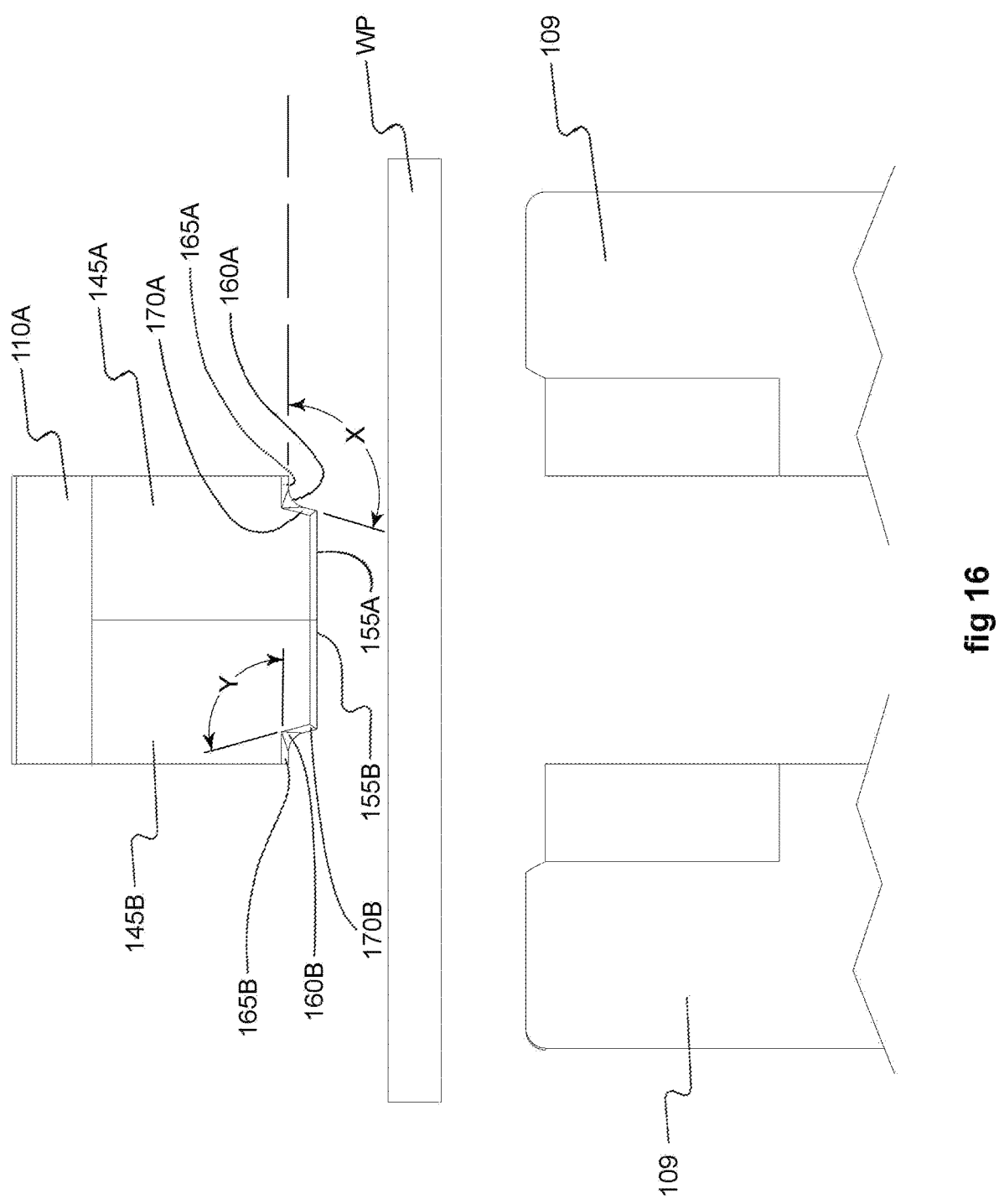
FIG. 16 is a front view of the shear illustrating how the tip assembly interacts with the anvil of a construction machine.

Briefly directing attention to FIG. 16, there is a notch 160A at the end of the piercing edge 155A of a first insert 130A and there is a similar notch 160B at the end of piercing edge 155B of a second insert 130B. The notch 160A has a wall 165A and a wall 170A which intersect to form an angle X of at least 90°. Notch 160B at the end of the piercing edge 155B of the second insert 130B has a similar arrangement. The notch 160B has a wall 165B and a wall 170B which intersect to form an angle Y of at least 90°. A workpiece WP is positioned between the base 110 of the first jaw 107 and the blades of the second jaw 109.

With attention directed to FIG. 9, a cutting edge 180A is defined at the intersection of the second wall 140A and the wall 165A of the notch 160A. A similar cutting edge 180B exists at the intersection of the second wall 140B and the wall 165B of the notch 160B.

Figure 6:
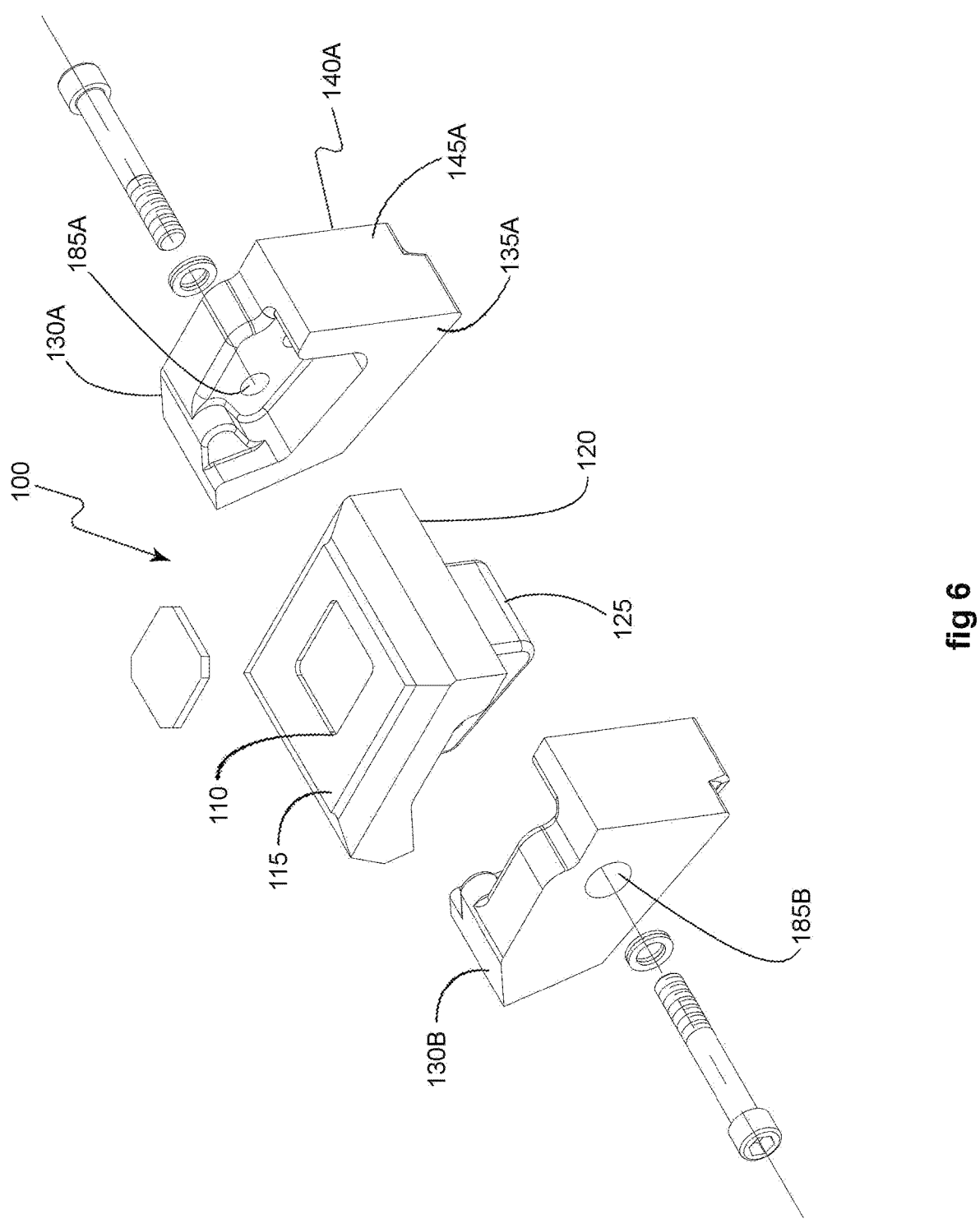
FIG. 6 is an exploded perspective view of the tip assembly in FIG. 4 oriented at a different angle than that of FIG. 5.
Figure 15:
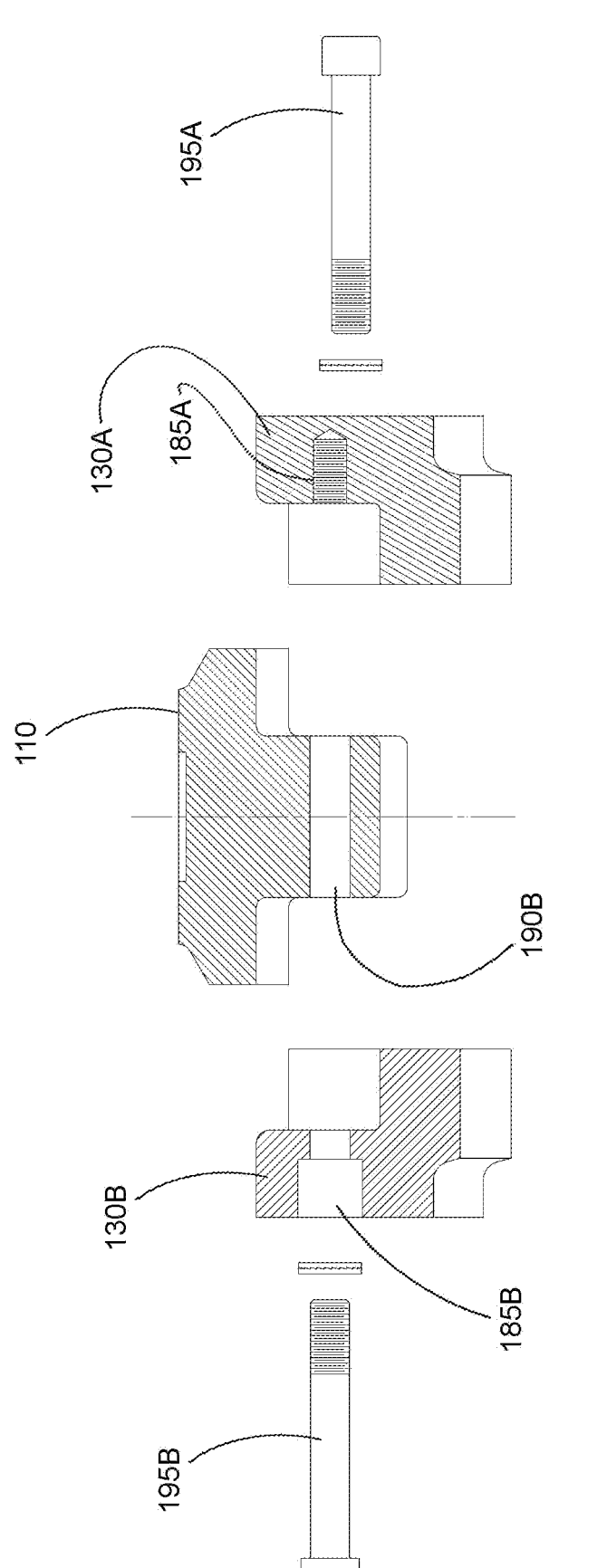
FIG. 15 is an exploded cross sectional view of the tip assembly along lines "15-15" in FIG. 14.

Directing attention to FIGS. 6 and 15, each insert 130A, 130B has a bore 185A, 185B extending therethrough.

Figure 7:
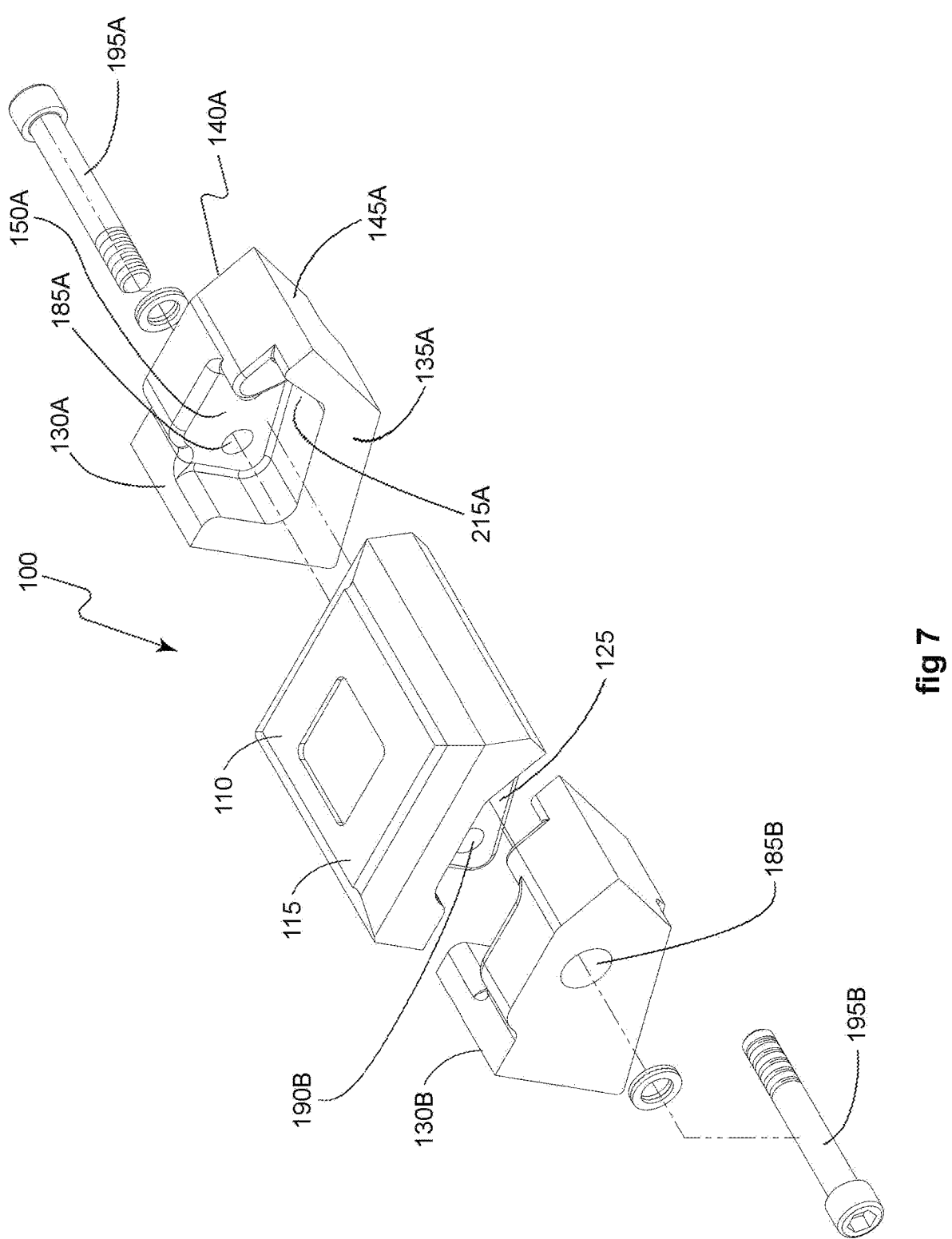
FIG. 7 is another exploded perspective view of the tip assembly in FIG. 4 but at yet another angle.
Figure 8:
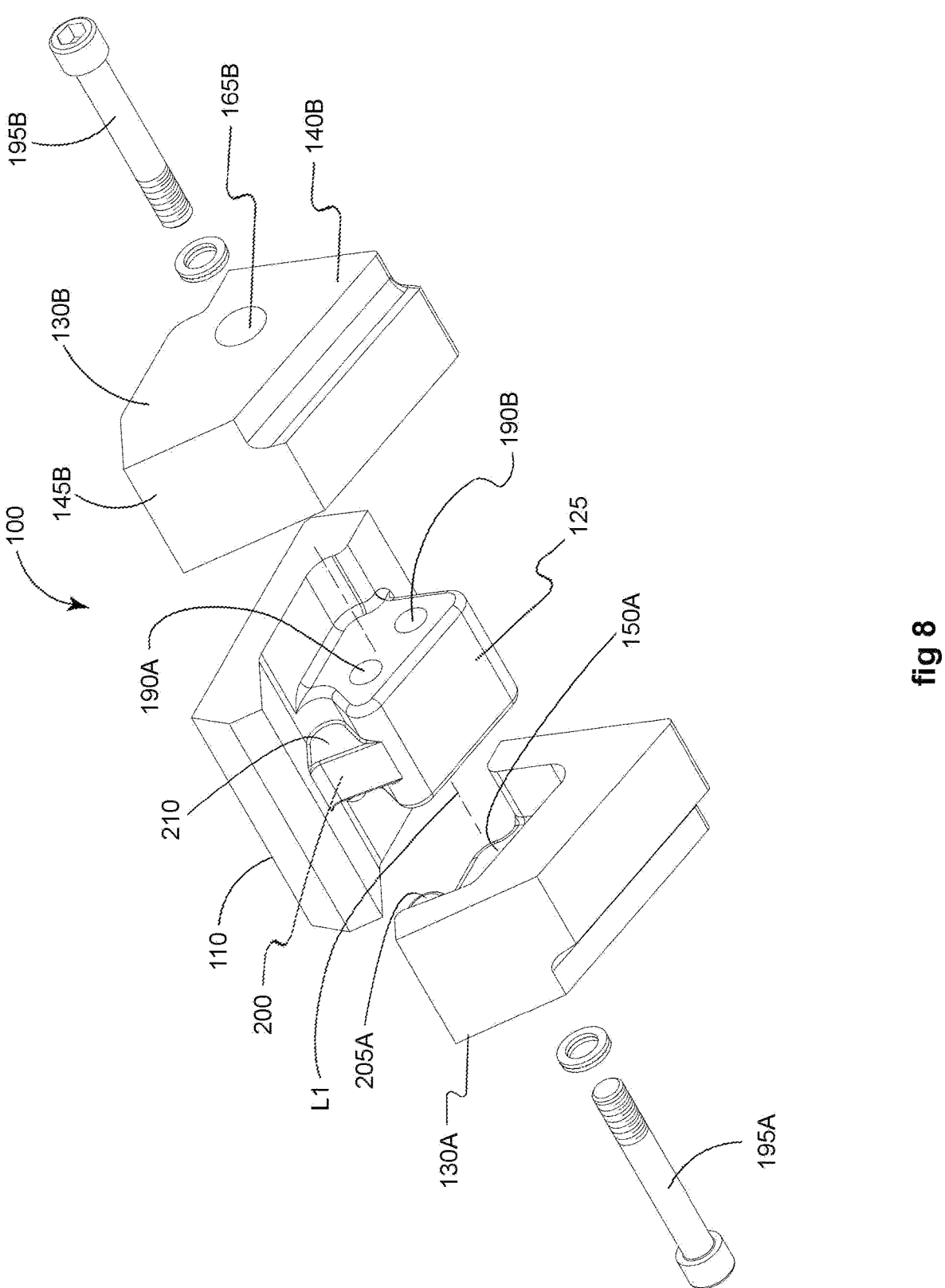
FIG. 8 is an exploded perspective view of the tip assembly in FIG. 4 illustrating the underside of the tip assembly.

Directing attention to FIG. 7, it is apparent that each bore 185A, 185B of inserts 130A, 130B is offset from the other and the protrusion 125 has matching offset bores 190A, 190B (see FIG. 8). The offset bores 190A, 190B align with the insert bores 185A, 185B such that separate bolts 195A, 195B may be dedicated to mating each insert 130A, 130B to the base 110.

Directing attention to FIG. 15, the bore 185A of the insert 130A is threaded and the second insert 130B is secured to the opposing first insert 130A with the threaded bolt 195B. The threaded bolt 195B extends through the first bore 185B of the second insert 130B and through a bore 190B in the base 110 to mate with the threaded bore 185A of the first insert 130A. The same arrangement exists with respect to insert 130A secured to insert 130B (See FIG. 8). As previously discussed, the first insert 130A has a locking recess 150A that conforms to the protrusion 125 to limit movement of the first insert 130A in directions perpendicular to the longitudinal axis L1. When the bolts 195A, 195B are secured to the respective inserts, then each insert 130A, 130B is secured such that movement in all directions is limited.

Directing attention to FIG. 8, the base 110 further includes a support bar 200 spanning between the protrusion 125 and a remaining portion of the underside 120 of the base 110. The purpose of the support bar 200 is to provide additional stiffness to the base 110, but furthermore provide additional lateral stability to each insert 130A, 130B secured to the base 110.

The locking recess 150A of the first insert 130A (see FIG. 5) has an engaging tab 205A that engages with a locking recess 210 (FIG. 8) within the protrusion 125. By doing so the engaging tab 205A engages with the locking recess 210 of the protrusion 125.

The engaging tab 205A may abut against the support bar 200 to provide additional lateral support.

Figures 12A, 12B, 13:
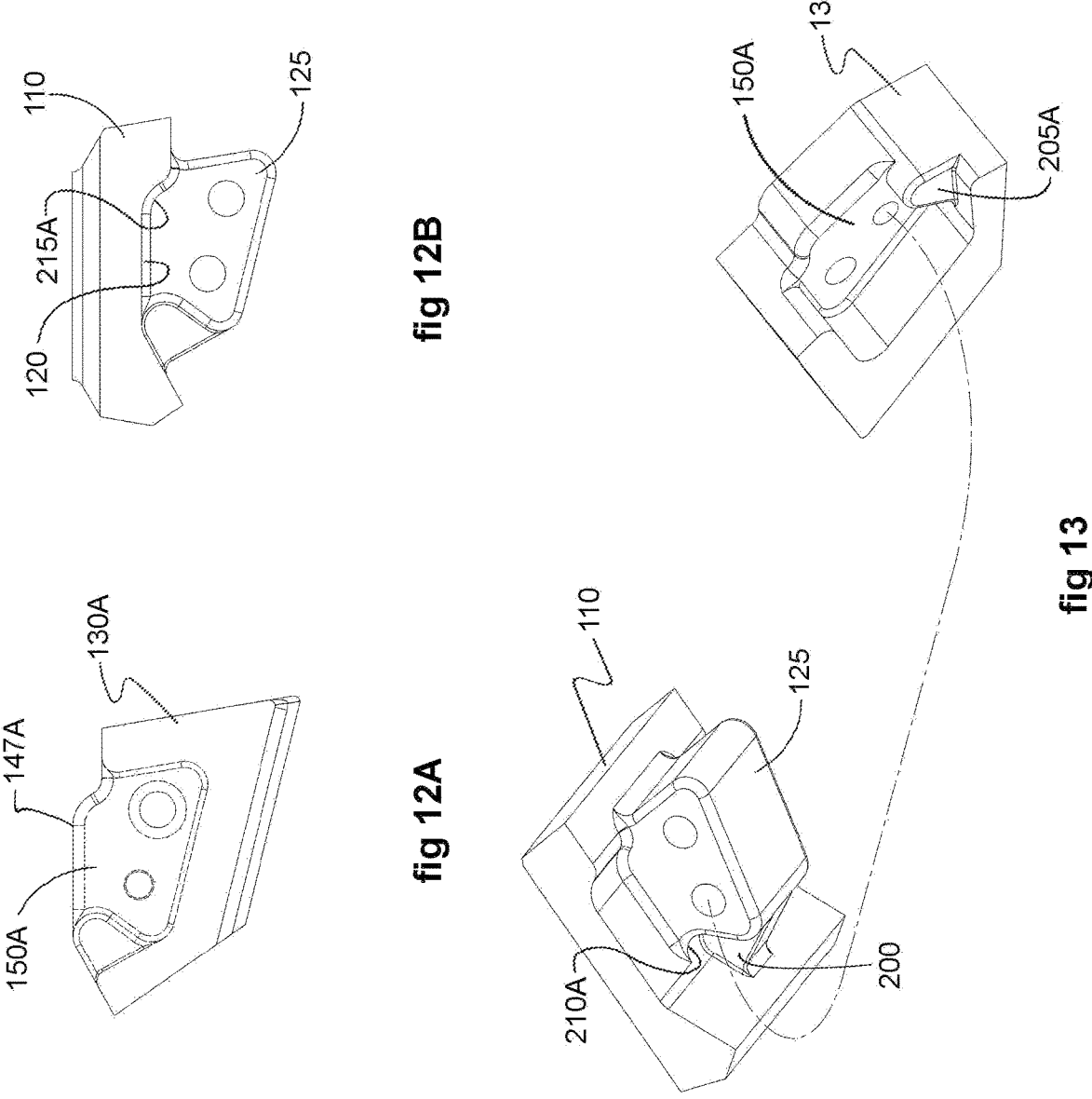
FIG. 12A is a side view of the insert in FIG. 11.
FIG. 12B is a side view of the base in FIG. 8.
FIG. 13 is modified perspective view illustrating how the insert is mated with the base.

As illustrated in, for example, FIGS. 12A and 12B, the protrusion 125 generally has a shape of a trapezoid and the locking recess 150A of the insert 130A has a matching shape.

In FIGS. 12A and 12B, the underside 120 of the base 110 further includes a concave segment 215A adjacent to the protrusion 125 of the insert 130A, which abuts with the top side 147A of the first insert 130A. The top side 147A has a matching shape with the underside 120 of the base 110.

Figure 10:
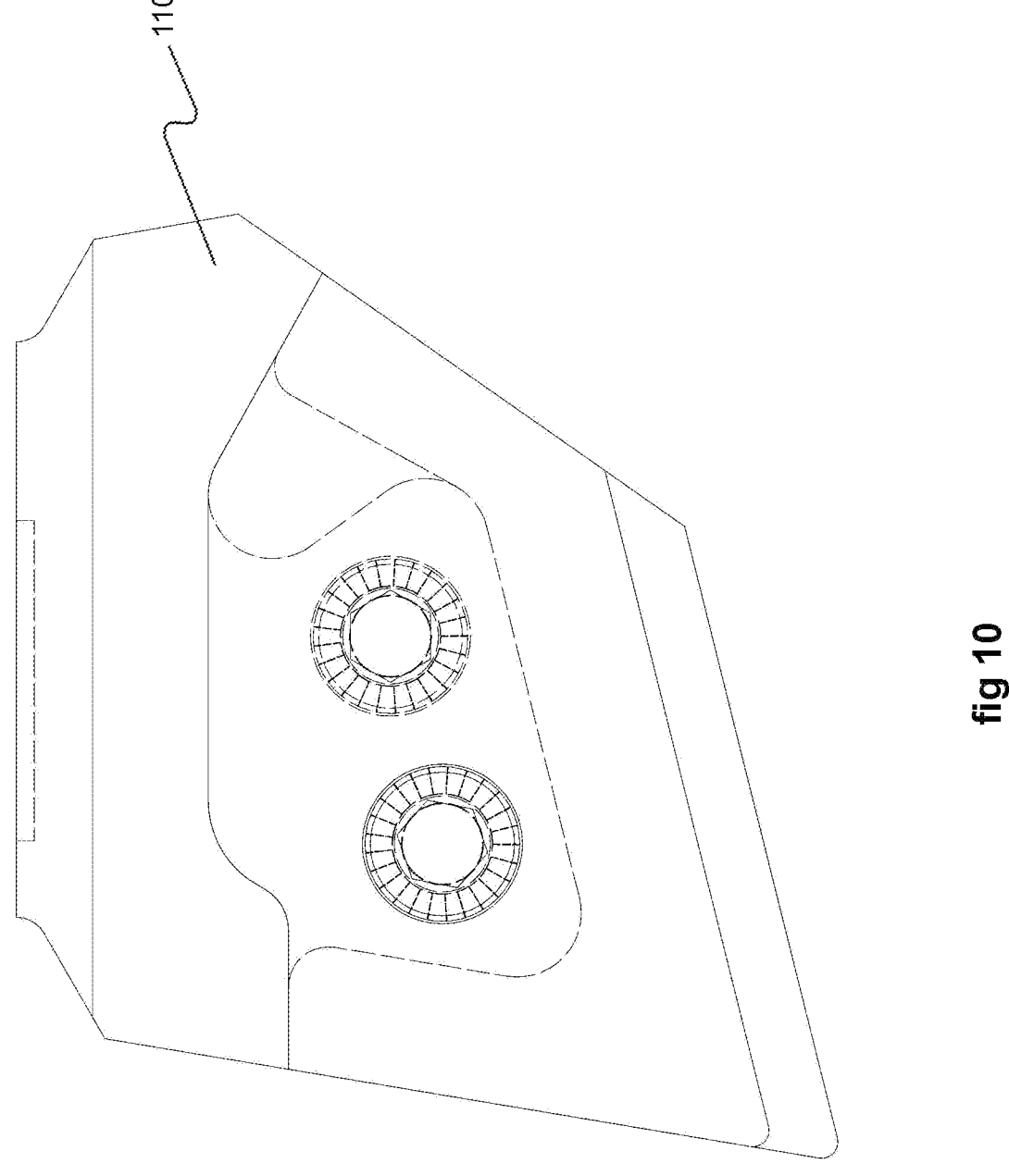
FIG. 10 is a side view the tip assembly in FIG. 9.
Figure 11:
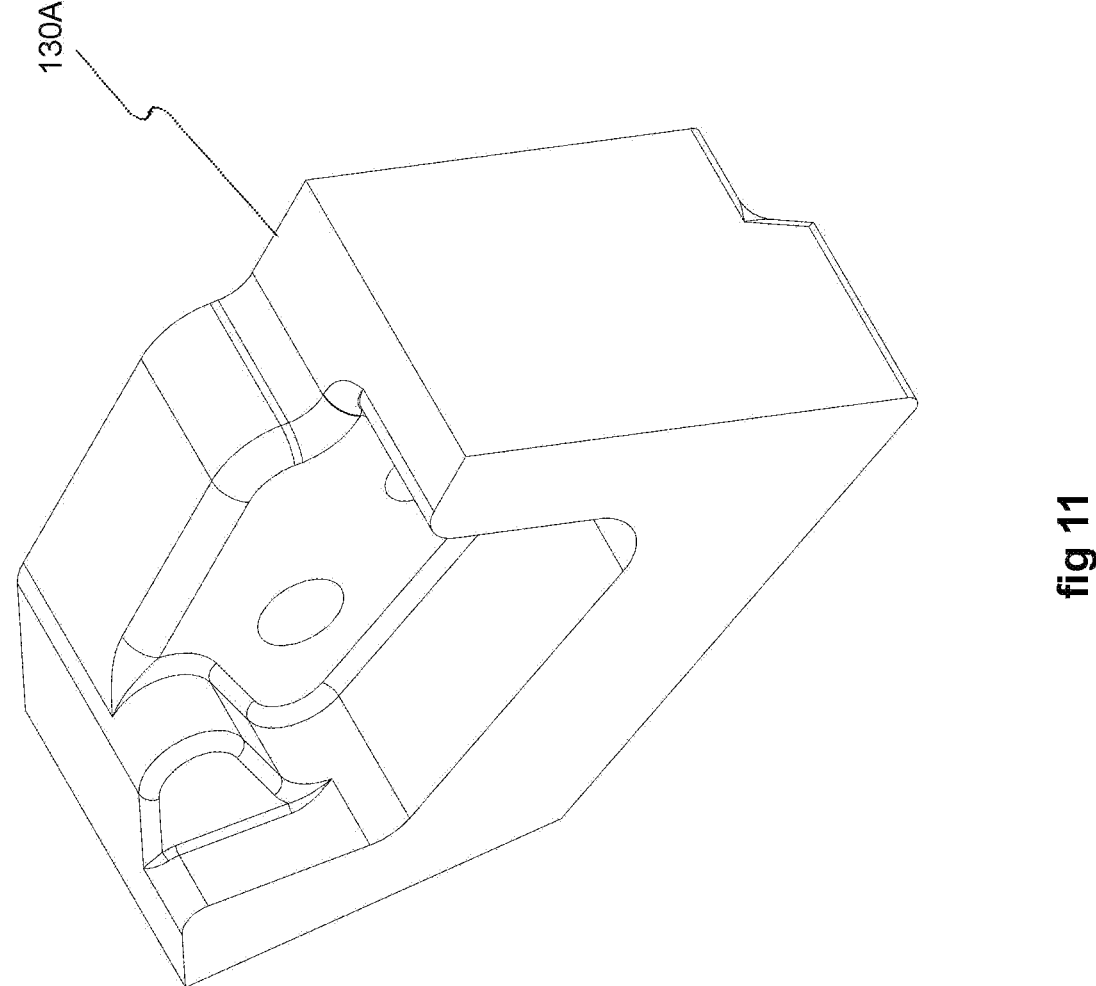
FIG. 11 is a perspective view of an insert in accordance with the subject invention.

FIG. 10 is a side view of the base 110 and FIG. 11 is a side view of the first insert 130A. FIG. 13 illustrates the manner by which the first insert 130A is mated with the base 110.

In order to simplify manufacturing, and allow for repairability, each insert 130A, 130B and the base 110 may be made of casting material.

While what has so far been described is the tip assembly 100, another embodiment of the subject invention is directed to the insert 130A associated with the tip assembly 100. The insert 130A is to be used with the base 110, which is attached to a first jaw 107 of a jaw set for demolition and construction equipment. As previously discussed, and as illustrated in FIGS. 5 and 9, the insert 130A has a first wall 135A and an opposing second wall 140A with a front side 145A extending there between. At the intersection of the front side 145A and the bottom side 147B is a piercing edge 155A of the first insert 130A. A locking recess 150A extends within the first wall 135A, wherein the locking recess 150A may generally have the shape of a trapezoid.

Figure 14:
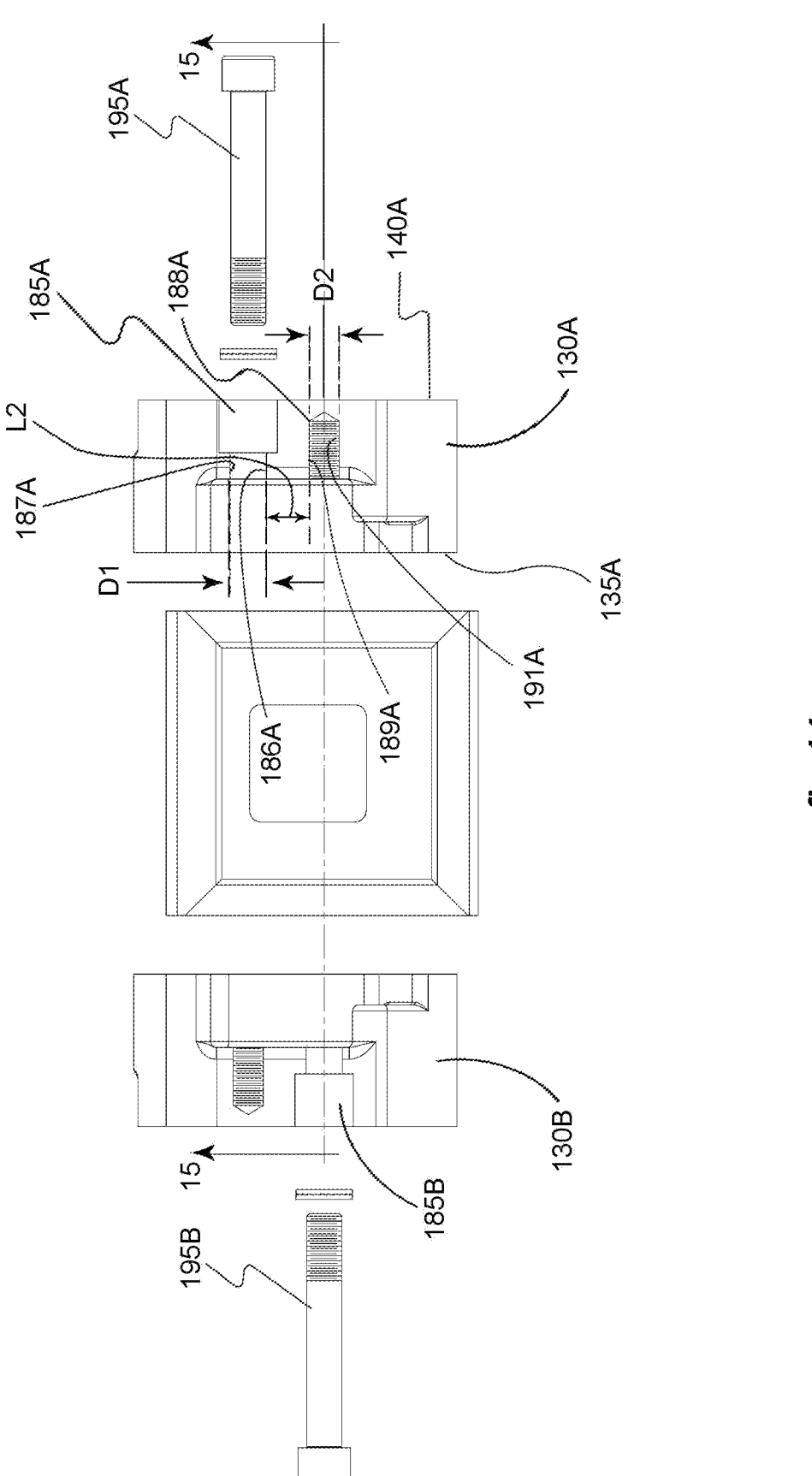
FIG. 14 is an exploded top view of the tip assembly, but still including bolts and washers at the ends.

Previously discussed was the separation between bores within an insert to accommodate two bolts. More particularly, directing attention to FIG. 14, the first insert 130A has a first bore 185A with a first bore diameter D1 and an inner bore wall 186A and an outer bore wall 187A. The first bore 185A extends through the inner bore wall 186A and the outer bore wall 187A. A second bore 188A has a second bore diameter D2 and an inner bore wall 189A and an outer bore 191A. The inner bore wall 186A of the first bore 185A is spaced from the inner wall 189A of the second bore 188A by a length L2 at least as great as the diameter D1 of the first bore 185A. In such a fashion, two bolts 195A, 195B may pass through the insert 130A wherein one bolt 195A may be used to secure the first insert 130A to the second insert 130B and another bolt 195B may be used to secure the second insert 130B to the first insert 130A.

The locking recess 150A (FIG. 5) of the insert 130A further includes a concave segment 215A at an open side of the locking recess 150A to further engage the protrusion 125. The insert 130A further includes a second bore 185B (FIG. 14) offset from the first bore 185A to accept a bolt 195B.

The first bore 185A of the insert 130A is blank to permit a bolt 195A to extend therethrough and the second bore 188A is threaded to engage a threaded bolt 195B.

Figure 17:
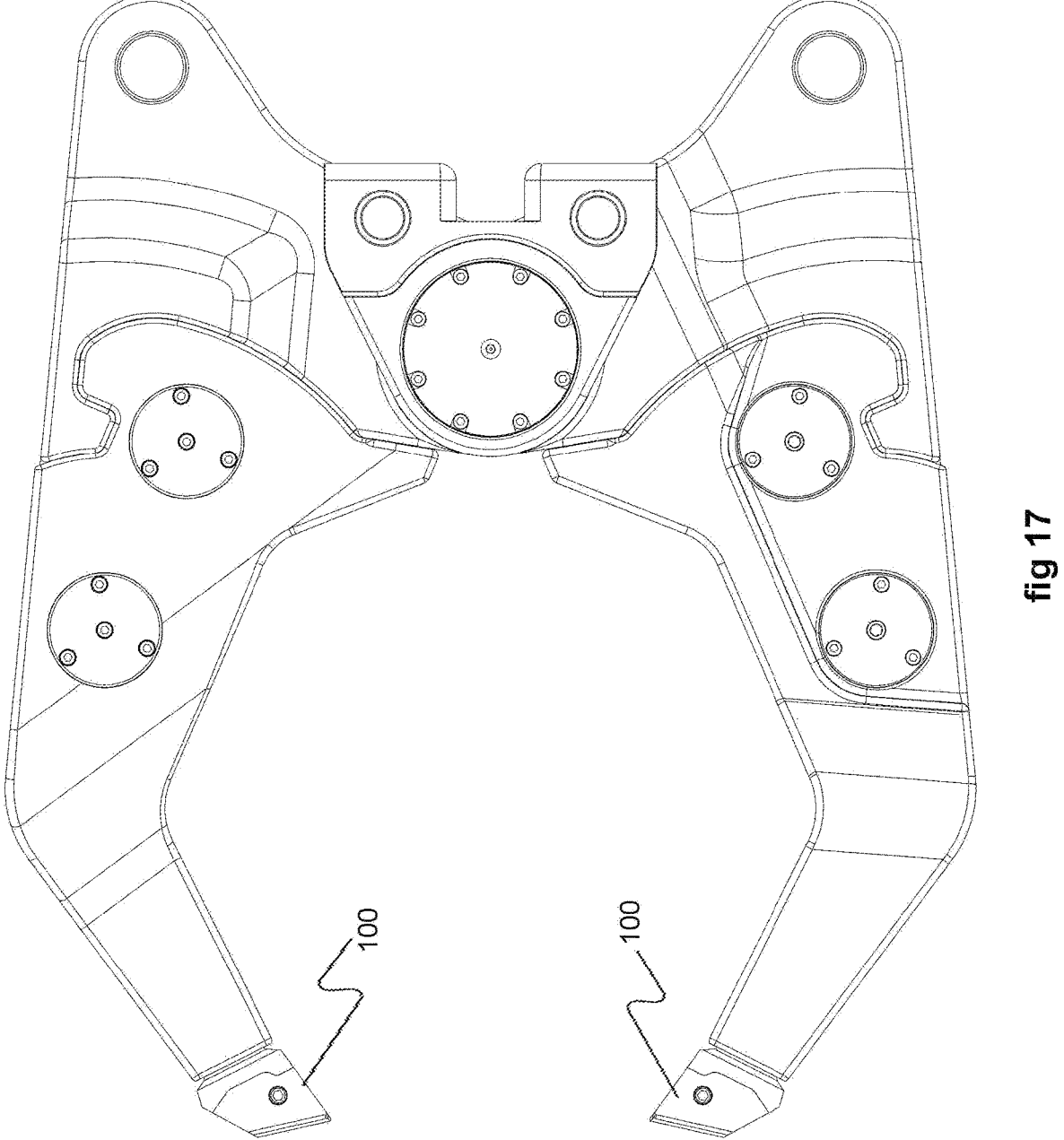
FIG. 17 is a side view of a gripper utilizing the tip assembly in accordance with the subject invention.

FIG. 17 illustrates the manner by which the tip assembly 100 may be used with a gripper.

The invention has been described with reference to the preferred embodiments. Obvious modifications and alterations will occur to others upon reading and understanding the proceeding detail description. It is intended that the invention be construed as including all such modifications and alterations.

The invention claimed is:

1. A tip assembly for a jaw of a jaw set for demolition and construction equipment comprising:
  a base having:
    a top side comprising a mounting surface for engaging a surface of the jaw and an underside opposite the top side;
    a protrusion protruding from the underside away from the top side and extending along a longitudinal axis;
  a first insert mounted to the base and a second insert mounted to the base, wherein each insert has:
    a first wall and an opposing second wall with a front side extending therebetween; and a locking recess that conforms to the protrusion to limit movement of the insert in directions perpendicular to the longitudinal axis,
  wherein the base further comprises a support bar spanning between the protrusion and a remaining portion of the underside of the base,
  wherein the protrusion comprises a generally trapezoidal cross-sectional shape such that the protrusion is wider toward a bottom of the protrusion and narrower toward a top of the protrusion where the protrusion protrudes from the underside of the base, and
  wherein the base having the top side, the underside, and the protrusion is removable from the jaw.

2. The tip assembly according to claim 1, wherein the first wall of the first insert contacts the first wall of the second insert to enclose the inserts over the protrusion.

3. The tip assembly according to claim 2, wherein the front side and a bottom side of each insert intersect to form a piercing edge.

4. The tip assembly according to claim 3, wherein the piercing edges of the first insert and the second insert abut to define an expanded piercing edge.

5. The tip assembly according to claim 4, wherein there is a notch at each end of the expanded piercing edge.

6. The tip assembly according to claim 5, wherein the notch has walls that form an angle of at least 90 degrees.

7. The tip assembly according to claim 4, wherein a cutting edge is defined at an intersection of the second wall and a notch and the notch extends along the entire length of the cutting edge.

8. The tip assembly according to claim 1, wherein each insert has a bore extending therethrough, wherein the bores are offset from one another and the protrusion has matching offset bores which align with the insert bores such that a separate bolt may be dedicated to mating each insert to the base.

9. The tip assembly according to claim 8, wherein one bore within each insert is threaded and each insert is secured to the opposing insert with threaded bolts that mate with the threaded bore of each insert such that for each insert movement in all directions is limited.

10. The tip assembly according to claim 1, wherein the locking recess of each insert has an engaging tab that engages with a matching indentation within the protrusion.

11. The tip assembly of claim 1, wherein the underside of the base further includes a concave segment adjacent to the protrusion and wherein the top of the insert includes a matching shape.

12. The tip assembly according to claim 1, wherein the inserts and the base are made of casting material.

13. A tip assembly for a jaw of a jaw set for demolition and construction equipment comprising:
  a base having a top side for engaging a surface of the jaw, an underside opposite the top side, a protrusion protruding form the underside away from the top side, and a support bar spanning between the protrusion and a remaining portion of the underside of the base; and
  an insert comprising:
    a first wall and an opposing second wall with a front side extending therebetween, wherein an edge of the first wall is a piercing edge; and
    a locking recess extending within the first wall;
    a first bore having a first bore diameter and inner and outer bore walls, wherein the first bore extends through the first wall and second wall;
    a second bore having a second bore diameter and inner and outer bore walls;

wherein the inner bore wall of the first bore is spaced from the inner bore wall of the second bore by a length at least equal to the diameter of the first bore wall, and wherein the locking recess comprises a generally trapezoidal cross-sectional shape extending into the first wall such that the locking recess is wider toward a bottom of the locking recess and narrower toward a top of the locking recess where the locking recess is open.

14. The tip assembly according to claim 13, wherein the locking recess further includes a convex segment.

15. The tip assembly according to claim 13, wherein the first bore is blank to permit a bolt to extend therethrough and the second bore is threaded to engage a threaded bolt.

* * * * *